United States Patent [19]
Uno et al.

[11] Patent Number: 4,579,186
[45] Date of Patent: Apr. 1, 1986

[54] VEHICLE STEERING SYSTEM

[75] Inventors: Takaaki Uno, Zama; Yasuji Shibahata, Yokohama; Yasumasa Tsubota, Yokosuka, all of Japan

[73] Assignee: Nissan Motor Co., Ltd., Yokohama, Japan

[21] Appl. No.: 658,508

[22] Filed: Oct. 9, 1984

[30] Foreign Application Priority Data

Oct. 15, 1983 [JP] Japan .................. 58-193013
Oct. 15, 1983 [JP] Japan .................. 58-193018

[51] Int. Cl.$^4$ .............................................. B62D 5/06
[52] U.S. Cl. .................... 180/140; 180/141; 180/143
[58] Field of Search ................ 180/140, 141, 143

[56] References Cited

U.S. PATENT DOCUMENTS

| | | | |
|---|---|---|---|
| 3,305,041 | 2/1967 | Sehramm | 180/140 |
| 3,572,460 | 3/1971 | Berlich | 180/140 |
| 3,814,203 | 6/1974 | Gieszl | 180/140 |
| 4,440,254 | 4/1984 | Shibahata et al. | 180/140 |
| 4,441,572 | 4/1984 | Ito et al. | 180/143 |

FOREIGN PATENT DOCUMENTS 54-159921 12/1979 Japan .
57-99470 6/1982 Japan .

Primary Examiner—Joseph F. Peters, Jr.
Assistant Examiner—Donn McGiehan
Attorney, Agent, or Firm—Leydig, Voit & Mayer Ltd.

[57] ABSTRACT

A vehicle steering system comprises a power cylinder drivingly connected to front wheels and forming part of a power steering system, and an actuator drivingly connected to rear wheels and forming part of a so-called compliance steer control system. The power cylinder and the actuator are supplied with hydraulic fluid from a pump through first and second control valves which are operated in response to the turning effort applied to a steering wheel. Additionally, a flow dividing valve is provided to distribute the fluid from the pump into the first and second control valves in a predetermined flow dividing ratio, thereby allowing effective independent operations of the power steering system and the compliance steer control system without affecting each other.

17 Claims, 12 Drawing Figures

VEHICLE STEERING SYSTEM

BACKGROUND OF THE INVENTION

1. Field of the Invention

This invention relates in general to an improvement in a steering system of a vehicle and more specifically to an improvement in a steering system comprising a power steering system for assisting in turning front wheels under the action of hydraulic fluid and a rear wheel control system for controllably turning rear wheels.

2. Description of Prior Art

In order to improve cornering performance of modern automotive vehicles, a steering system by which the controllable turning of both front and rear wheels are possible has been proposed, which system is disclosed as a compliance steer control system, for example, in U.S. Pat. No. 4,440,254 issued on Apr. 3, 1984 to Shibahata et al.

This compliance steer control system is equipped with hydraulic actuators associated with elastomeric insulators interposed between a rear suspension arrangement and a vehicle body. The hydraulic actuators are supplied with hydraulic pressure to be fed to a power cylinder of a power steering system, thus achieving a control to increase or decrease so-called compliance steering of the rear wheels during cornering of the vehicle. This control system arrangement is intended mainly to improve vehicle cornering performance at high vehicle speeds by turning the rear wheels in the same direction as the front wheels upon turning a steering wheel to set vehicle cornering characteristics on the understeer side.

Now, as is well known, in order to provide an appropriate steering feeling to a driver, the conventional power steering system is arranged such that steering assist power developed by the power cylinder is minimized at high vehicle speeds and no steering assist power is developed when the driver's steering effort applied to the steering wheel is very slight. This arrangement provides a so-called non-sensitive range in which no steering assist power is developed. Accordingly, the power cylinder of the power steering system is supplied with low hydraulic pressure during high vehicle speeds and is supplied with no hydraulic pressure when a very slight turning effort is applied to the steering wheel.

However, in the compliance steering control of rear wheels, it is desirable to cause a greater compliance steering to turn the rear wheels large amounts during high speed cornering for the purpose of attaining more stable cornering. Additionally, it is also desirable to turn the rear wheels even upon a slight turning angle of the front wheels or a slight steering effort applied to the steering wheel being slight when the steering wheel is rotated. In this regard, it has been extremely difficult to operate the conventional compliance steer control system so as to obtain optimum characteristics for cornering performance wherein the hydraulic actuators thereof are supplied with the hydraulic pressure fed to the power cylinder of the power steering system. As a result, it becomes necessary to control the hydraulic pressure supplied to the compliance steer control system, independently from the hydraulic pressure supplied to the power cylinder of the power steering system.

In this regard, even if individual control valves are respectively provided for the power steering system and for the compliance steer control system which are different from each other in operational characteristics, their desired function will not be attained, particularly because these valves are of the type wherein pressurized hydraulic fluid discharged from an oil pump is fed back to a reservoir when the steering wheel is in its neutral position. More specifically, in a power steering system with a non-sensitive range as stated above, when hydraulic fluid is fed to the hydraulic actuators of the compliance steer control system upon a slight steering effort being applied to the steering wheel, hydraulic circuit flow resistance on the compliance steer control system side increases and therefore hydraulic fluid discharged from the oil pump is unavoidably fed back to the reservoir through the control valve for the power steering system. As a result, an insufficient amount of hydraulic fluid will be supplied to the hydraulic actuators of the compliance steer control system.

SUMMARY OF THE INVENTION

A steering system of a vehicle according to the present invention comprises a power cylinder associated with a steering gear for front wheels and forming part of a power steering system, and an actuator operatively connected to rear wheels and forming part of a compliance steer control system. The fluids supplied to the power cylinder and to the actuator are respectively controlled by first and second control valves which are operated under the steering effort applied to a steering wheel. Additionally, a flow dividing valve is provided to distribute the fluid discharged from a pump to the first and second control valves in a predetermined flow dividing ratio.

Accordingly, by virtue of the flow dividing valve, the power steering system for the front wheels and the compliance steer control system for the rear wheels are not affected be each other, thereby making possible reliable operation of the power steering system and the compliance steer control system while improving reliability in cornering performance of the vehicle. Furthermore, it becomes unnecessary to employ a plurality of pumps, and therefore the whole steering system is made small-sized to achieve production cost reduction thereof.

BRIEF DESCRIPTION OF THE DRAWINGS

The features and advantages of the steering system according to the present invention will be more clearly appreciated from the following description taken in conjunction with the accompanying drawings in which like reference numerals designate corresponding parts and elements, and in which.

DETAILED DESCRIPTION OF THE INVENTION

Figure 1:
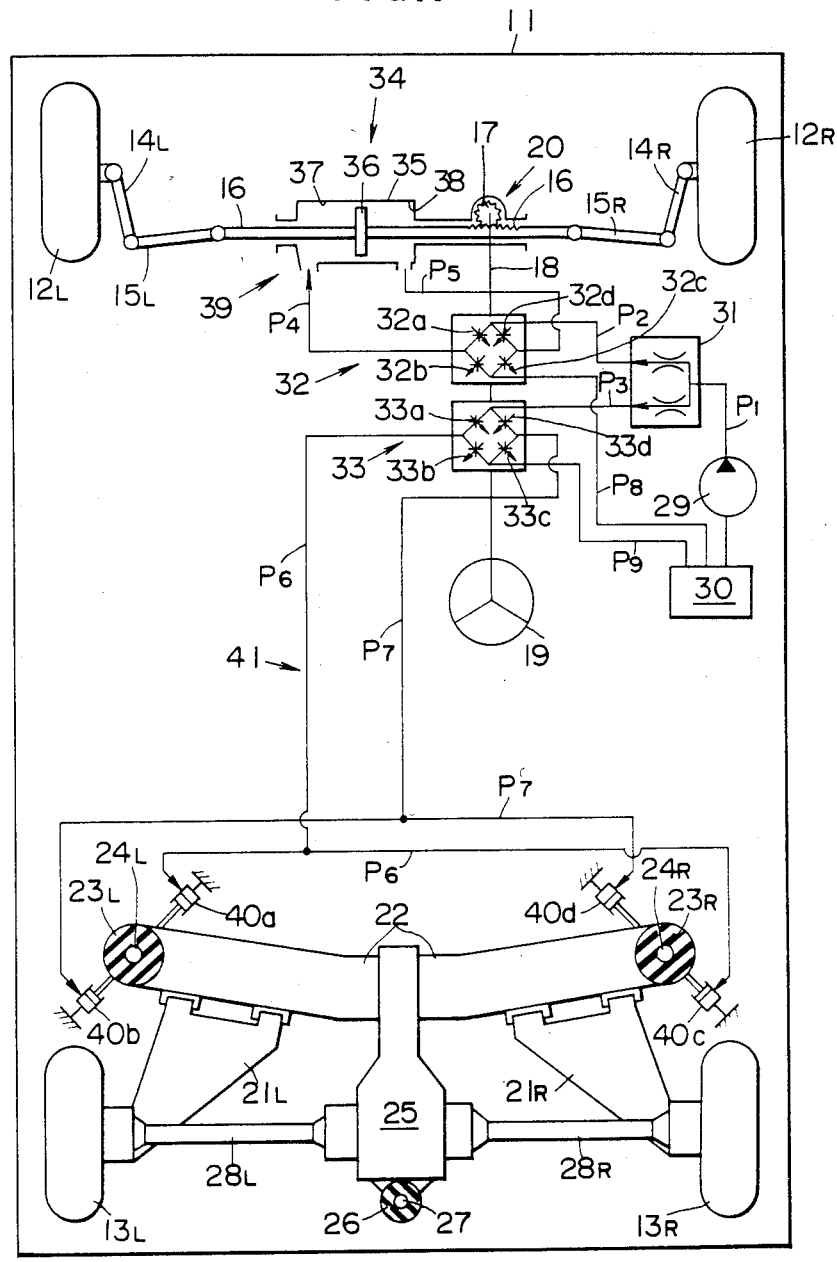
FIG. 1 is a schematic representation of a first embodiment of a steering system in accordance with the present invention.

Referring now to FIG. 1, a first embodiment of a steering system according to the present invention is illustrated. In this embodiment, the steering system is shown to be incorporated with, for example, an automotive vehicle whose body is designated by the reference numeral 11. The steering system comprises front wheels 12R, 12L, and rear wheels 13R, 13L which are all rotatably mounted to the vehicle body 11. The front wheels 12R, 12L are respectively connected with the opposite ends of a tie rod or rack 16 through knuckle arms 14R, 14L and side rods 15R, 15L. The rack 16 meshes with a pinion 17 which is connected through a steering shaft 18 to a steering wheel 19. These rack 16 and pinion 17 constitute a steering gear 20 as usual.

The rear wheels 13R, 13L are pivotally supported to a rear suspension member 22 through semi-trailing arms 21L, 21R, respectively. The rear suspension member 22 is elastically supported at its opposite ends on the vehicle body 11 through elastomeric insulators 23R, 23L. As shown, each of pins 24L, 24R secured to the vehicle body 11 is disposed at the central part of the elastomeric insulator 23R, 23L in such a manner that the rear suspension member 22 is insulated from each pin 24L, 24R. A differential gear housing 25 is secured to the rear suspension member 22 by means of bolts (not shown). This differential gear housing 25 is also elastically supported to the vehicle body 11 through an elastomeric insulator 26. A pin 27 secured to the vehicle body 11 is disposed at the central part of the elastomeric insulator 26 so that the differential gear housing is insulated from the pin 27. The differential gear in the housing 25 is connected through drive shafts 28R, 28L with the rear wheels 13R, 13L, respectively.

A pump 29 is provided to pressurize hydraulic fluid from a reservoir 30 and discharge the pressurized hydraulic fluid. This pump 29 constitutes a hydraulic fluid providing means and is fluidly connected to an inlet port (not identified) of a flow dividing valve 31 via a line $P_1$. The flow dividing valve 31 has two outlet ports (not identified) which are fluidly connected to first and second control valves 32, 33, respectively, which are associated with the steering shaft 18. The flow dividing valve 31 is arranged to divide in a predetermined dividing ratio the pressurized fluid from the pump 29 into two portions which are respectively fed to the inlet ports (not identified) of the first and second control valves 32, 33 via lines $P_2$, $P_3$.

The first control valve 32 has a return port (not identified) which is communicated through a line $P_8$ with the reservoir 30, and two outlet ports (not identified) which are communicated through lines $P_4$, $P_5$ with a power cylinder 34 associated with the rack 16. The first control valve 32 is arranged to control the hydraulic fluid supplied from the flow dividing valve 31 in response to the rotation of the steering wheel 19 (or the steering effort applied to the steering wheel 19 in this embodiment) and then to supply the thus controlled hydraulic fluid into the power cylinder 34. More specifically, the first control valve 32 has four variable orifices 32a, 32b, 32c, and 32d whose flow passage area changes in response to the steering effort applied to the steering wheel 19, thereby functioning to control the hydraulic fluid under the action of the variable orifices. The power cylinder 34 includes a cylinder body 35 disposed in the vehicle body 11. A piston 36 fixed to the rack 16 is slidably movably disposed in the cylinder body 35 in a manner to define two fluid chambers 37, 38 inside the cylinder body 35. The power cylinder 34 is arranged to develop a steering assist power in response to the pressure differential between the fluid chambers 37, 38, so as to drive the rack 16. The pump 29, reservoir 30, first control valve 32, and power cylinder 34 constitute a power steering system 39 which is known per se.

The second control valve 33 has two outlet ports (not identified) which are respectively communicated through lines $P_6$, $P_7$ with a first group of actuators 40a, 40c, and a second group of actuators 40b, 40d. Each actuator 40a–40d is of a hydraulic cylinder type and is mechanically interposed between the rear suspension member 22 and the vehicle body 11. The second control valve 33 further has a return port (not identified) which is communicated through a line $P_9$ with the reservoir 38. The second control valve 33 has four variable orifices 33a, 33b, 33c, and 33d whose flow passage area changes in response to the steering effort applied to the steering wheel 19, thereby controlling the hydraulic fluid supplied from the flow dividing valve 31 in response to the steering effort thus to supply the controlled hydraulic fluid to the respective actuators 40a, 40b, 40c, 40d. Each of the actuators 40a, 40b, 40c, 40d is connected with the vehicle body 11 and the rear suspension member 22 by means of pin joints, and function to distort the elastomeric insulator 23R, 23L under the action of the hydraulic fluid supplied from the second control valve 33, thereby causing the rear suspension member 22 to rotatably move around the pin 27. In other words, the actuators 40a, 40b, 40c, 40d function to turn the rear wheels 13R, 13L by rotatably moving the rear suspension member 22. The pump 29, reservoir 30, second control valve 33 and actuators 40a, 40b, 40c, 40d constitute a compliance steer control system or rear wheel steering system 41. This compliance steer control system is disclosed in U.S. Pat. No. 4,440,254 and therefore the detailed explanation thereof is omitted for the purpose of simplicity of illustration.

The manner of operation of the thus arranged steering system will be discussed hereinafter.

This steering system of the vehicle is adapted to turn the front wheels 12R, 12L and the rear wheels 13R, 13L relative to a vertical plane (not shown) containing an axis of the vehicle body extending in the vehicle straight ahead direction, in response to the rotation of the steering wheel 19. In this steering system, the power steering system 39 develops the steering assist power to assist the steering effort for turning the front wheels 12R, 12L, while the compliance steer control system 41 turns the rear wheels 13R, 13L in the same direction as the front wheels 12R, 12L. Additionally, the power steering system 39 is provided with a so-called non-sensitive range in which no steering assist power is developed when the steering effort applied to the steering wheel 19 is very slight, as stated above.

Now, when turning of the steering wheel 19 has been stopped, the first control valve 32 is in a state where the respective variable orifices 32a, 32b, 32c, 32d have the same opening degree or flow passage area, while the second control valve 33 is in a state where the respective variable orifices 33a, 33b, 33c, 33d have the same opening degree or flow passage area. Consequently, the hydraulic fluid discharged from the pump 29 is distributed to the respective control valves 32, 33 by the flow dividing valve 31 and fed back through these respective control valves 32, 33 to the reservoir 30.

When a very slight steering effort (within the non-sensitive range) is applied to the steering wheel 19 which steering effort causes the vehicle to turn to the right (for example), the second control valve 33 is so operated that the variable orifices 33a, 33c are throttled in response to the steering effort while the variable orifices 33b, 33d are opened wider in response to the steering effort. However, the opening degrees of the respective variable orifices 32a, 32b, 32c, 32d of the first control valve 32 do not change because of the non-sensitive range set in the power steering system 39. As a result, the hydraulic fluid suplied through the line $P_2$ from the flow dividing valve 31 is fed back from the first control valve 32 through the line $P_8$ into the reservoir 30 without being supplied to the power cylinder 34. At this time, the second control valve 33 controls the hydraulic fluid supplied through the line $P_3$ from the flow dividing valve 31, in response to the steering effort, thus feeding the hydraulic fluid of a relatively high pressure to the actuator 40b, 40d via the line $P_7$ while the hydraulic fluid of a relatively low pressure to the actuators 40a, 40c via the line $P_6$. Accordingly, the front wheels 12R, 12L are turned to the right through the steering gear 20 only under the steering effort transmitted from the steering wheel 19, whereas the rear wheels 13R, 13L are turned to the right. At this time, since the second control valve 33 supplies the high pressure hydraulic fluid to the respective actuators 40b, 40d, hydraulic circuit flow resistance increases on the second control valve (33) side; however, a predetermined flow amount of the hydraulic fluid can be supplied to the second control valve 33 by virtue of the flow dividing valve 31. Consequently, turning the rear wheels 13R, 13L is reliably carried out without giving rise to pressure drop of the fluid supplied to the actuators 40b, 40d.

When the steering effort applied to the steering wheel 19 increases, the first control valve 32 is so operated that the variable orifices 32b, 32d are throttled in response to the steering effort while the variable orifices 32a, 32c are opened wider, the hydraulic fluid of a relatively high pressure is supplied to the fluid chamber 38 of the power cylinder 34. Consequently, the power cylinder 34 develops the steering assist power to drive the rack 16, thus assisting the rotation of the steering wheel 19. The second control valve 33 is so operated that the change in flow passage area of the variable orifices 33a, 33b, 33c, 33d is further promoted, so that further higher pressure hydraulic fluid is supplied to the actuators 40b, 40d, thus increasing the turning angle of the rear wheels 13R, 13L. At this time, predetermined amounts of hydraulic fluid are supplied to the control valves 32, 33 in accordance with the flow dividing ratio of the flow dividing valve 31, and therefore the power steering system 39 and the compliance steer control system can be effectively controlled in response to the steering effort applied to the steering wheel 19 without affecting each other.

As discussed above, since the hydraulic fluid discharged from the single pump 29 is distributed through the flow dividing valve 31 to the respective control valves 32, 33, the power steering system 39 and the compliance steer control system 41 are operated independently from each other, thereby obtaining a better cornering performance of the vehicle.

Furthermore, by virtue of distribution of the hydraulic fluid discharged from the pump 29 under the action of the flow dividing valve 31, it becomes unnecessary to use two independent pumps for the power steering system 39 and the compliance steer control system 41. This makes the steering system small-sized to achieve production cost reduction thereof.

Figure 2:
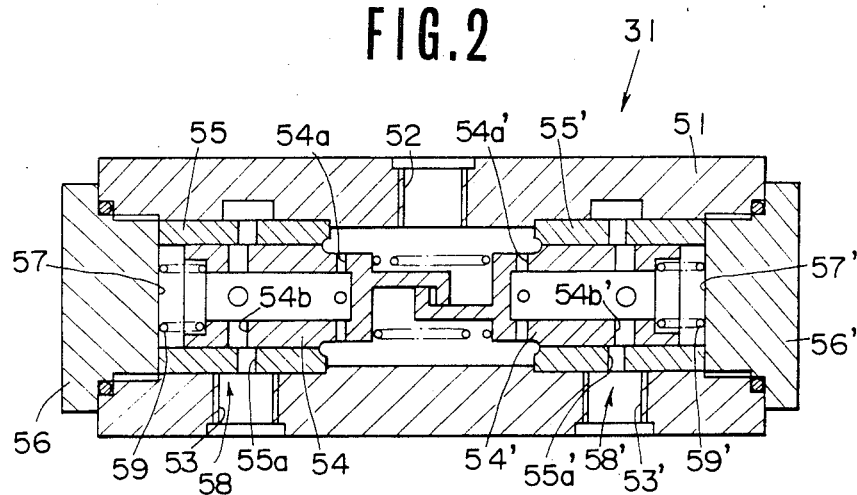
FIG. 2 is a cross-sectional view of an example of a flow dividing valve used in the steering system of FIG. 1.

FIG. 2 shows an example of the flow dividing valve 31 used in the steering system of FIG. 1. The flow dividing valve 31 includes a housing 51 which is formed with an inlet port 52 communicated with the line $P_1$ and two outlet ports 53, 53' one of which is communicated with the line $P_2$ and the other the line $P_3$. A pair of spools 54, 54' are slidably movably disposed through sleeves 55, 55' within a bore (no numeral) of the housing 51. The spools 54, 54' are integrally provided at their opposite ends with generally L-shaped portions (no numerals) which are engageable with each other. The spools 54, 54' define control chambers 57, 57' between them and plugs 56, 56' which are secured to the housing 51, respectively. The spools 54, 54' are formed with fixed orifices 54a, 54a', and with holes 54b, 54b'. These holes 54b and 54b' are communicable with holes 55a, 55a' which are in communication with the outlet ports 53, 53', respectively. Accordingly, the control chambers 57, 57' are brought into communication with the outlet ports 53, 53' when the holes 54b, 54b' are communicated with the holes 55a, 55a', respectively. The holes 54b, 54b' of the spools 54, 54' and holes 55a, 55a' of the sleeves 55, 55' constitute control orifices 58, 58', respectively, for changing the flow passage area in accordance with the displacement of the spools 54, 54'. The reference numerals 59, 59' denote centering springs which are disposed in the control chambers 57, 57' and function to bias the respective spools 54, 54' into their neutral positions, respectively.

This flow dividing valve 31 so operates as to change the flow passage area of the control orifices 58, 58' in response to the fluid pressure fed through the fixed orifices 54a, 54a' into the control chambers 57, 57', thus maintaining in a predetermined flow dividing ratio the amounts of the fluids flowing out from the outlet ports 53, 53'. It will be understood that the flow dividing ratio can be varied by controlling the flow passage area of the fixed orifices 54a, 54a' and by the characteristics of the control orifices 58, 58'.

Figure 4:
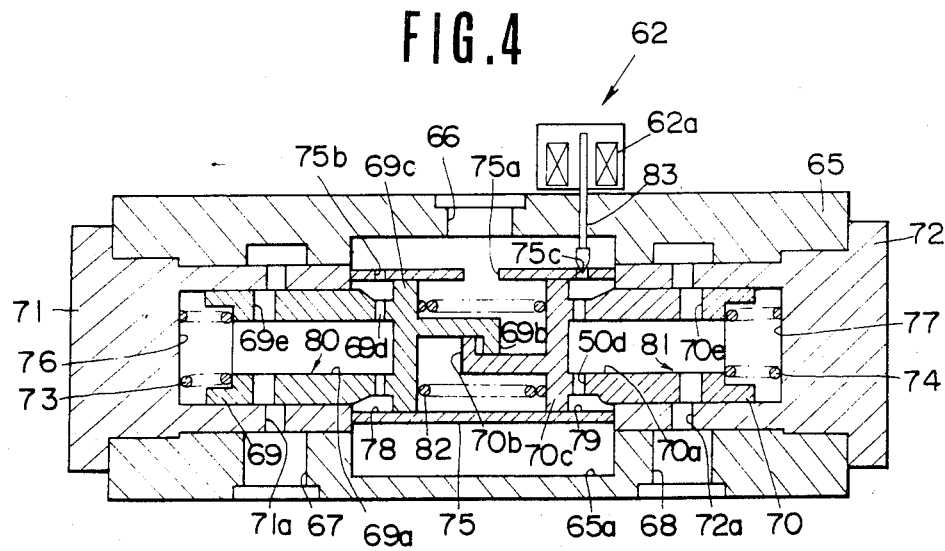
FIG. 4 is a cross-sectional view of an example of a flow dividing ratio variable type flow dividing valve used in the steering system of FIG. 3.
Figure 3:
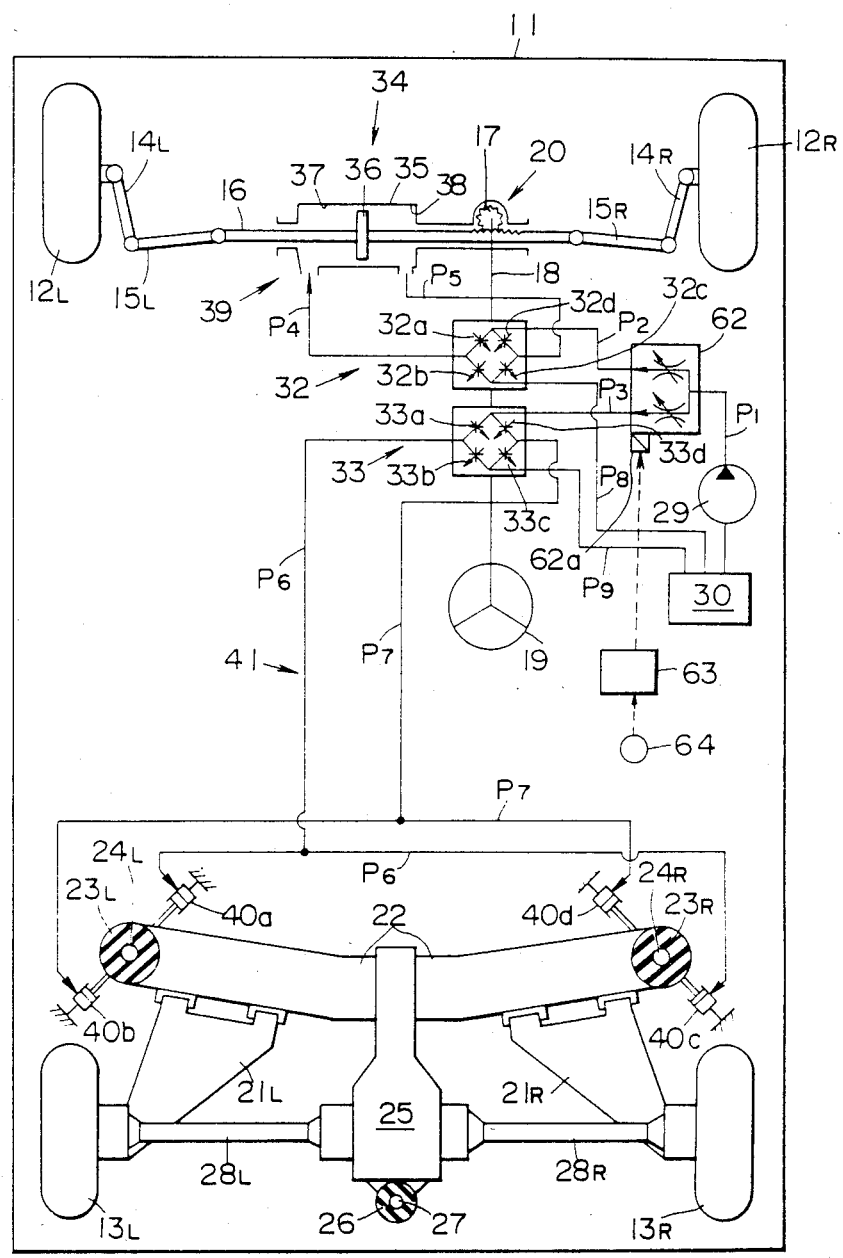
FIG. 3 is a schematic representation similar to FIG. 1, but showing a second embodiment of the steering system according to the present invention.
Figure 5A:
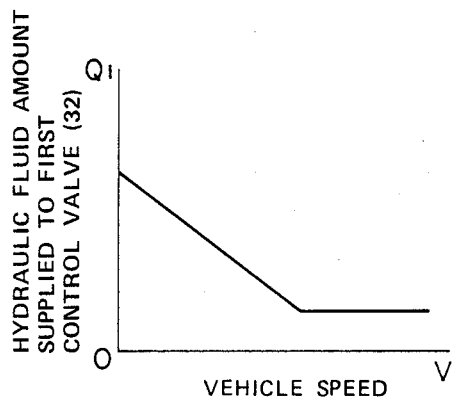
FIGS. 5A and 5B are graphs showing the manner of variations of amounts of hydraulic fluids supplied to first and second control valves, respectively, in terms of vehicle speeds which control valves are used in the steering system of FIG. 3.
Figure 5B:
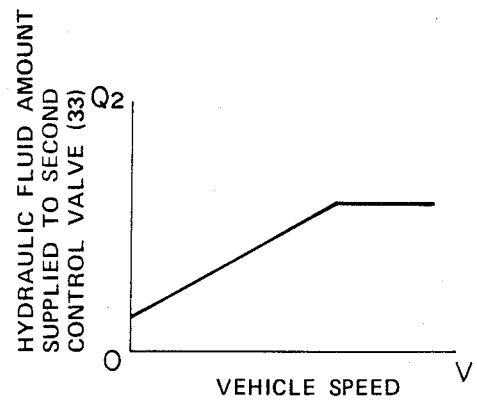
Figure 6A:
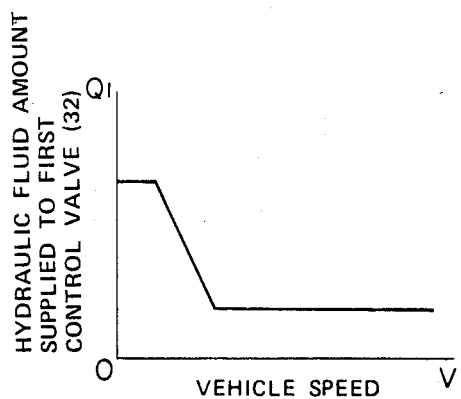
FIGS. 6A and 6B are graphs similar to FIGS. 5A and 5B, but showing another manner of variations of the hydraulic fluids to be supplied to the first and second control valves, respectively.
Figure 6B:
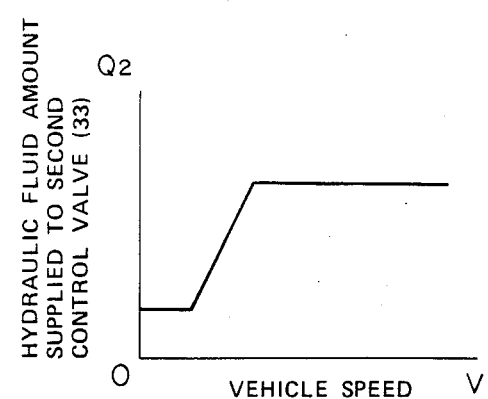

FIGS. 3 and 4 illustrate a second embodiment of the steering system according to the present invention, which is similar to the first embodiment of FIGS. 1 and 2 with the exception that the hydraulic fluid discharged from the pump 29 is distributed to the first and second control valves 32, 33 by means of a flow dividing valve 62 of the flow dividing ratio variable type, whose flow dividing ratio is controlled to be changed in response to vehicle speeds.

As shown, the flow dividing ratio variable type flow dividing valve 62 has a solenoid 62a which is electrically connected to a control unit 63, so that the flow dividing ratio of the valve 62 changes in accordance with the value of electric current supplied to the solenoid 42a from the control unit 63. Electrically connected to the control unit 63 is a vehicle speed sensor 64 which outputs a signal representing of a vehicle speed V. The control unit 63 changes the value of electric current supplied to the solenoid 62a in response to the signal from the sensor 64, thereby controlling the flow dividing ratio of the flow dividing valve 62 in response to the vehicle speeds V.

An example of the flow dividing ratio variable type flow dividing valve 62 is shown in FIG. 4. The flow dividing valve 62 in FIG. 4 includes a valve housing 65 which is formed with a bore 65a, an inlet port 66 which opens to the bore 65a and is fluidly connected through the line $P_1$ to the pump 29, and two outlet ports 67, 68 which open to the bore 65a and are fluidly connected through the lines $P_2$ and $P_3$ to the first and second control valves 32, 33, respectively. The opposite ends of bore 65a of the valve housing 65 are closed by plugs 71, 72 each of which is formed with a bore (no numerals). A pair of spools 69, 70 are slidably disposed within the bores of the plugs 71, 72, respectively. A spring 73 is compressively disposed between the inner wall of the plug 71 and the spool 69, while a spring 74 is compressively disposed between the inner wall of the plug 72 and the spool 70. The plugs 71, 72 are formed with holes 71a, 72a which are communicated with the outlet ports 67, 68, respectively. Additionally, a generally cylindrical member 75 is securely interposed between the opposite ends of the plugs 71, 72, and formed with a main hole 75a and two control orifices 75b, 75c.

Each of the spools 69, 70 is formed hollow and defines a fluid chamber 76, 77 between it and the inner wall of the plug 71, 72. The spools 69, 70 are integrally provided at their opposite ends with generally L-shaped portions 69a, 70b which are engageable with each other. Each spool 69, 70 is formed with an annular radial projection 69c, 70c which is in slidable contact with the inner surface of the generally cylindrical member 75 maintaining a fluid tight seal therebetween. The annular radial projections 69c, 70c form annular grooves (no numeral) around the outer surfaces of the spools 69, 70 which annular grooves define chambers 78, 79 between the generally cylindrical member 75 and the spools 69, 70, respectively. As shown, the control orifices 75b, 75c of the generally cylindrical member 75 open to the chambers 78, 79, respectively. Furthermore, each spool 69, 70 is formed with a communication hole 69d, 70d through which the chamber 78, 79 is communicated with the fluid chamber 76, 77, and a hole 69e, 70e which opens to the fluid chamber 76, 77 and agreeable or communicable with a hole 71a, 72a of the plug 71, 72 so as to establish communication between the fluid chamber 76, 77 with the outlet port 67, 68. The hole 69e, 70e and the hole 71a, 72a of the plug 71, 72 constitute a variable orifice 80, 81 which changes the flow passage area in response to the displacement of the spool 69, 70. The reference numeral 82 denotes a spring compressively interposed between the opposite ends of the spools 69, 70 to bias the spools 69, 70 in the direction away from each other.

A needle valve 83 is movably disposed in the control orifice 75c of the generally cylindrical member 75 in such a manner as to control the flow passage area of the control orifice 75c upon being driven by the solenoid 62a drivingly connected to the needle valve 83. The solenoid 72a is electrically connected to the control unit 63.

This flow dividing ratio variable type flow dividing valve 62 is so arranged that the needle valve 83 controls the hydraulic pressure applied through the inlet port 66 to the fluid chamber 77 by changing the flow passage area of the control orifice 75c, thus controlling the flow dividing ratio of the fluid to be fed to first and second control valves 32, 33. More specifically, in this flow dividing valve 62, the spools 69, 70 displace in accordance with fluid pressures within the fluid chambers 76, 77 and with the biasing force of the springs 73, 74, 82, so that the flow passage area of the variable orifices 80, 81 changes in response to the displacement of the spools 69, 70 thereby to maintain the flow amounts of hydraulic fluids flowing out through the outlet ports 67, 68 in a predetermined dividing ratio set by the control unit 63.

With the thus arranged steering control system of FIGS. 3 and 4, the hydraulic fluid discharged from the pump 29 is controlled in accordance with the vehicle speeds V and distributed to the first and second control valves 32, 33, for example, in the flow characteristics as shown in FIGS. 5A and 5B or FIGS. 6A and 6B. More specifically, the control unit 63 is so arranged that the amount $Q_1$ of the hydraulic fluid to be fed to the first control valve 32 for the power steering system 39 is controlled to decrease at a relatively high vehicle speed range, while the amount $Q_2$ of the hydraulic fluid to be fed to the second control valve 33 for the compliance steer control system 41 is controlled to increase at a relatively high vehicle speed range. It is to be noted that the relationship between the fluid amount Q discharged from the pump 29 and the divided fluid amounts $Q_1$ and $Q_2$ is represented by an equation: $Q=Q_1+Q_2$. As a result, the pressure of hydraulic fluid to be supplied to the power cylinder 34 of the power steering system 39 is lowered in the high vehicle speed range thereby to reduce the steering assist power developed in the power cylinder 34, so that the driver can obtain good steering feeling. In contrast with this, the pressure of hydraulic fluid to be supplied to the actuators 40a, 40b, 40c, 40d of the compliance steer control system 41 is raised in the high vehicle speed range thereby to enlarge the turning angle of the rear wheels 13R, 13L relative to the steering effort applied to the steering wheel 19, thus improving the turning performance of the vehicle.

Figure 7:
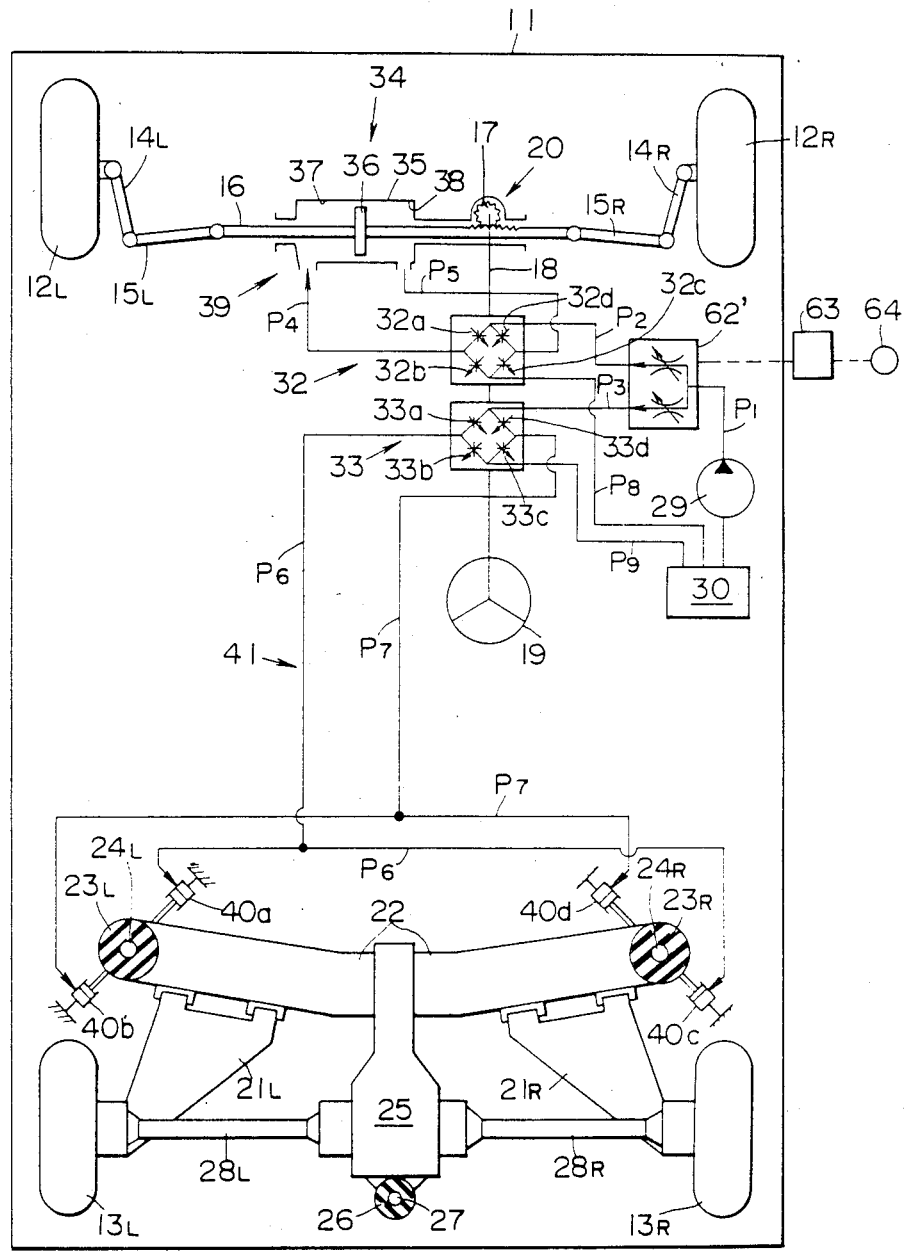
FIG. 7 is a schematic representation similar to FIG. 1, but showing a third embodiment of a steering system according to the present invention.
Figure 8:
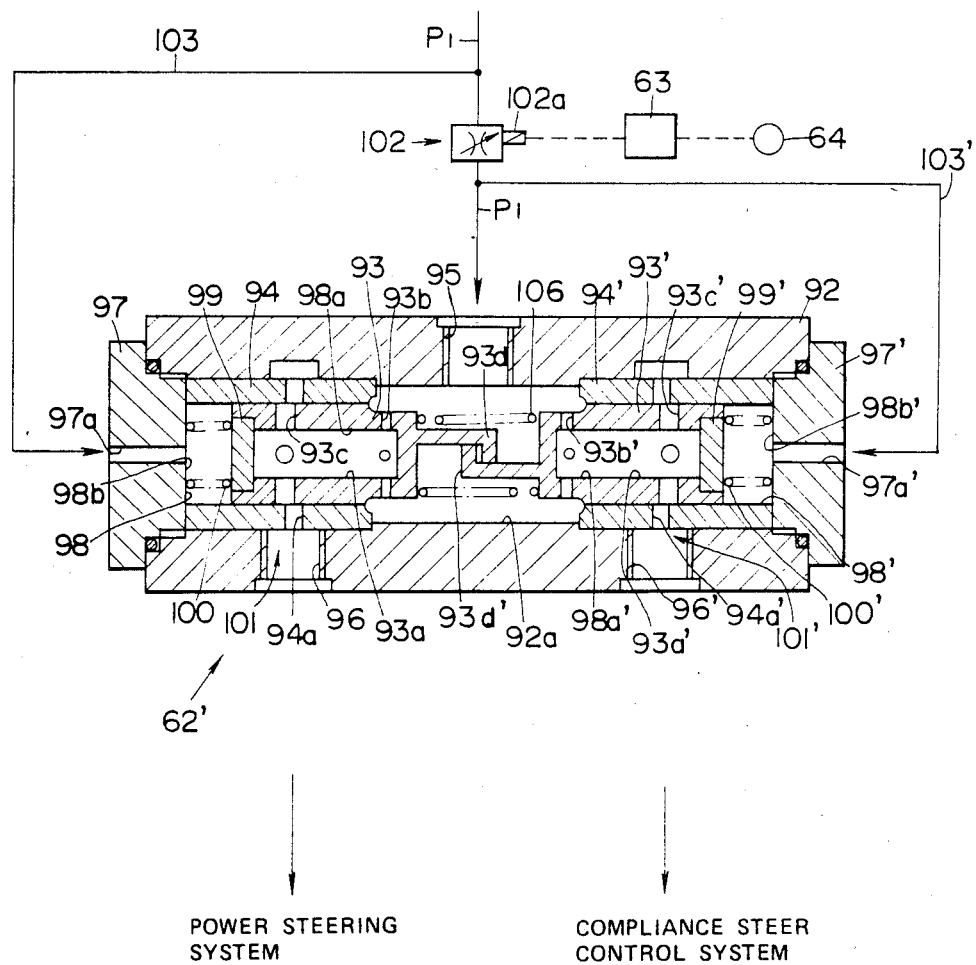
FIG. 8 is a cross-sectional view of another example of a flow dividing ratio variable type flow dividing valve used in the steering system of FIG. 7.

FIGS. 7 and 8 illustrate a third embodiment of the steering system according to the present invention, which is the same as the second embodiment of FIGS. 3 and 4 except for the kind of the variable ratio type flow dividing valve.

The variable ratio type flow dividing valve 62' in this embodiment includes a valve housing 92 which is formed with a bore 92a piercing from one end to the other end thereof. First and second spools 93, 93' are slidably movably disposed within the bore 92a through first and second sleeves 94 secured to the housing 92, 94', respectively. The valve housing 92 is formed with an inlet port 95 opened to the bore 92a, and two outlet ports 96, 96'. The opposite open ends of the valve housing 92 are closed by first and second plugs 97, 97', respectively.

The first and second spools 93, 93' are formed hollow to have bores 93a, 93a', respectively, each of which opens to the side of each plug 97, 97'. The first and second spools 93, 93' slidably fit in the first and second sleeves 94, 94' so as to define first and second control chambers 98, 98' between them and the plugs 97, 97', respectively. First and second pistons 99, 99' slidably fit in the bores 93a, 93a' of the first and second spools 93, 93', respectively, in a manner to be slidably movable in the same direction as the moving direction of the spools 93, 93', maintaining a fluid tight seal therebetween. The first piston 99 defines a first main control chamber 98a inside the first spool 93 and a first auxiliary control chamber 98b between it and the first plug 97, while the second piston 99' defines a second main control chamber 98a' inside the second spool 93' and a second auxiliary chamber 98b' between it and the second plug 97'. A first centering spring 100 is located within the first auxiliary chamber 98b in a manner to be compressively interposed between the first plug 97 and the first piston 99, while a second centering spring 100' is located within the second auxiliary chamber 98b' in a manner to be compressively interposed between the second plug 97' and the second piston 99'. These first and second springs 100, 100' bias the spools 93, 93' in the direction in which the spools 93, 93' approach each other.

The first spool 93 is formed with a first fixed orifice 93b through which the first main control chamber 98a is communicated with the inlet port 95, and a hole 93c which is communicable with a hole 94a formed in the first sleeve 94 and communicated with the outlet port 96. Similarly, the second spool 93' is formed with a second fixed orifice 93b' through which the second main control chamber 98a' is communicated with the inlet port 95, and a hole 93c' which is communicable with a hole 94a' formed in the second sleeve 94' and communicated with the outlet port 96'. The holes 94a, 94a' of the first and second sleeves and the holes 93c, 93c' of the first and second spools 93, 93' constitute first and second control orifices 101, 101', respectively, each of which functions to change the flow passage area in accordance with the displacement of the spool 93, 93'.

Additionally, a variable orifice 102 is disposed in the line P₁ near the inlet port 45. As shown, a portion of the line P₁ upstream of the variable orifice 102 is communicated with the first auxiliary control chamber 98b through a pilot line 103 and a passage 97a formed in the first plug 97. Similarly, a portion of line P₂ downstream of the variable orifice 102 is communicated with the second auxiliary control chamber 98b' through a pilot line 103' and a passage 97a' formed in the second plug 97'. The variable orifice 102 has a solenoid 102a electrically connected to the control unit or circuit 64 and so arranged that its flow passage area changes in accordance with the value of electric current supplied to the solenoid 102a. The control unit 63 is electrically connected to the vehicle sensor 64 for detecting a vehicle speed, thereby controlling the variable orifice 102 in response to the vehicle speeds.

The reference numeral 106 denotes a third centering spring compressively interposed between the first and second spools 43, 43' so as to bias them in the direction away from each other. The reference numerals 93d, 93d' denote generally L-shaped portions which are formed integral with the opposite ends of the first and second spools 93, 93', respectively. The generally L-shaped portions of the spools 43, 43' are engageable with each other in order to displace the first and second spools together as a single piece.

It will be understood that the inlet port 95 of the flow dividing valve 62' is fluidly connected through the line P₁ to the pump 29, while the outlet ports 96, 96' of the same are fluidly connected through the lines P₂, P₃ to the first and second control valves 32, 33, respectively, which are associated with the steering shaft 18, so that the flow dividing valve 62' distributes the hydraulic fluid discharged from the pump 29 into the first and second control valves 32, 33 in a flow dividing ratio corresponding to the vehicle speed. Thus, the flow dividing valve 62' in this embodiment is adapted to control the amount Q of the hydraulic fluid discharged from the pump 29 in response to the vehicle speed so as to regulate the amounts $Q_1$ and $Q_2$ of the hydraulic fluids to be supplied to the power steering system 39 and the compliance steer control system 41 in the characteristics as shown in FIGS. 5A and 5B, or FIGS. 6A and 6B. For this purpose, the control unit 64 is arranged to control the value of electric current to be fed to the variable orifice solenoid 102a in response to the vehicle speed.

The thus arranged variable ratio type flow dividing valve 62' operates as follows: First, a general operation thereof will be discussed. The hydraulic fluid fed through the inlet port 95 into the valve housing bore 92a flows through the first fixed orifice 93b into the first main control chamber 98a and thereafter flows out through the first control orifice 101 from the first outlet port 96, while the hydraulic fluid flowing through the second fixed orifice 93b' into the second main control chamber 98a' flows out through the second control orifice 101' from the second outlet port 96'. Consequently, the first spool 93 moves in accordance with a fluid pressure within the first main control chamber 98a and with the biasing force of the centering springs 100, 100', 106 thereby to change the flow passage area of the first control orifice 101. Similarly, the second spool 93' moves in accordance with a fluid pressure within the second main control chamber 98a' and with the biasing force of the centering springs 100, 100', 106 thereby to change the flow passage area of the second control orifice 101'. As a result, the flow dividing ratio between the fluids discharged from the outlet ports 96, 96' through the control orifices 101, 101' is maintained at a value determined by the flow passage area of the fixed orifices 93b, 93b' and the spring constant of the centering springs 100, 100', 106.

Now, when the vehicle cruises in the low vehicle speed range in which the amount of hydraulic fluid to be supplied to the power steering system 39 increases, the control unit 64 reduces the flow passage area of the variable orifice 102. Consequently, the hydraulic pressure prevailing in the line P₁ upstream of the variable orifice 102 is introduced to the auxiliary control chamber 98b to raise the hydraulic pressure therewithin, thereby increasing the force for biasing the first spool 93. At this time, the hydraulic pressure prevailing in the line P₁ downstream of the variable orifice 102 is introduced to the second auxiliary control chamber 98b' to lower the hydraulic pressure therewithin, thereby decreasing the force for biasing the second spool 93'. As a result, the displacement of the first and second spools 93, 93' is so made that the flow passage area of the first control orifice 101 increases thereby to increase the amount of hydraulic fluid to be supplied to the power steering system 39, while the flow passage area of the second control orifice 101' decreases, thereby to reduce the amount of hydraulic fluid to be supplied to the compliance steer control system 41.

When the vehicle cruises in the high vehicle speed range, the flow passage area of the variable orifice 102 increases, thereby reducing the pressure differential between the first auxiliary control chamber 98b supplied with the pressure in the line $P_1$ upstream of the variable orifice 102 and the second auxiliary control chamber 98b' supplied with the pressure in the line $P_1$ downstream of the variable orifice 102 in contrast with in the above-discussed low vehicle speed range. Accordingly, the first and second spools 93, 93' move in the opposite direction to in the above-discussed low vehicle speed range. As a result, the flow passage area of the first control orifice 101 decreases so as to decrease the amount of hydraulic fluid to be supplied to the power steering system 39, while the flow passage area of the second control orificie 101' increases so as to increase the amount of hydraulic fluid to be supplied to the compliance steer control system 41.

Thus, by changing the flow dividing ratio of the flow dividing valve 62' in response to vehicle speeds, the amount of hydraulic fluid to be supplied to the power steering system 39 and to the compliance steer control system 41 can be controlled in accordance with the characteristics as shown in FIGS. 5A and 5B, or FIGS. 6A and 6B, so that the cornering performance of the vehicle can be effectively improved.

Furthermore, with the flow dividing valve 62' of FIG. 8, since the flow dividing ratio is changed by displacing the first and second spools 93, 93' in response to the pressure differential between the upstream and downstream portions of the line $P_1$ relative to the variable orifice 102, a precise control of the flow dividing ratio is possible even in case the flow amount of the hydraulic fluid is relatively small. Besides, the fluid flow amount supplied through the fixed orifices 93b, 93b' is the same as that in the flow dividing valve of the flow dividing ratio non-variable type as shown in FIG. 2, and therefore the driving force of the spools 93, 93' is not lowered, so that flow dividing precision is prevented from its degradation.

As will be appreciated from the above, by virtue of the flow dividing valve 62', the steering assist power developed by the power cylinder 34 decreases in the high vehicle speed range, while the turning angle of the rear wheels 13R, 13L relative to the rotation of the steering wheel 19 increases, thus effectively improving the cornering performance of the vehicle.

Figure 9:
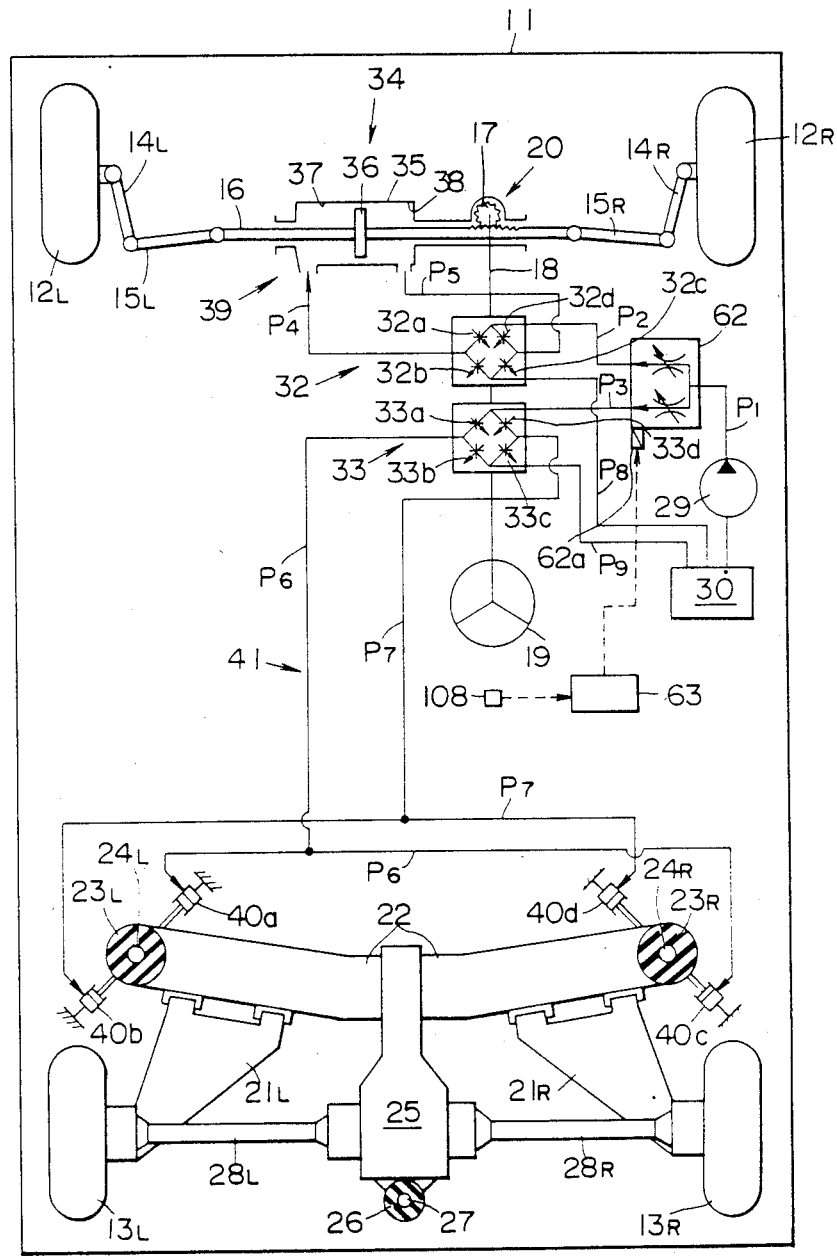
FIG. 9 is a schematic representation of a fourth embodiment of the steering system according to the present invention.

FIG. 9 illustrates a fourth embodiment of the steering system according to the present invention, which is similar to the second embodiment of FIGS. 3 and 4 with the exception that the flow dividing ratio of the flow dividing valve 62 is changeable by a driver's manual operation.

The steering system of this embodiment comprises a manually operated switch 108 which is electrically connected to the control unit 63. This switch 108 is disposed near a driver's seat in order that a driver can operates the switch 108. The flow dividing ratio of the flow dividing valve 62 changes upon operation of this switch 108.

With this steering system of FIG. 9, when the driver operates the manually operated switch 108, the control unit 63 supplies electric current to the solenoid 62a, thereby changing the flow dividing ratio of the flow dividing valve 62. Accordingly, the cornering and steering characteristics of the vehicle can be set at desirable ones for the driver. Furthermore, evne in case this steering system is installed to vehicles of the other kinds, the steering and cornering characteristics is adjustable to be fit for the individual vehicles. Accordingly, this steering system can be readily installed to vehicles of the other kinds, thereby widening the use of the steering system of this embodiment.

Figure 10:
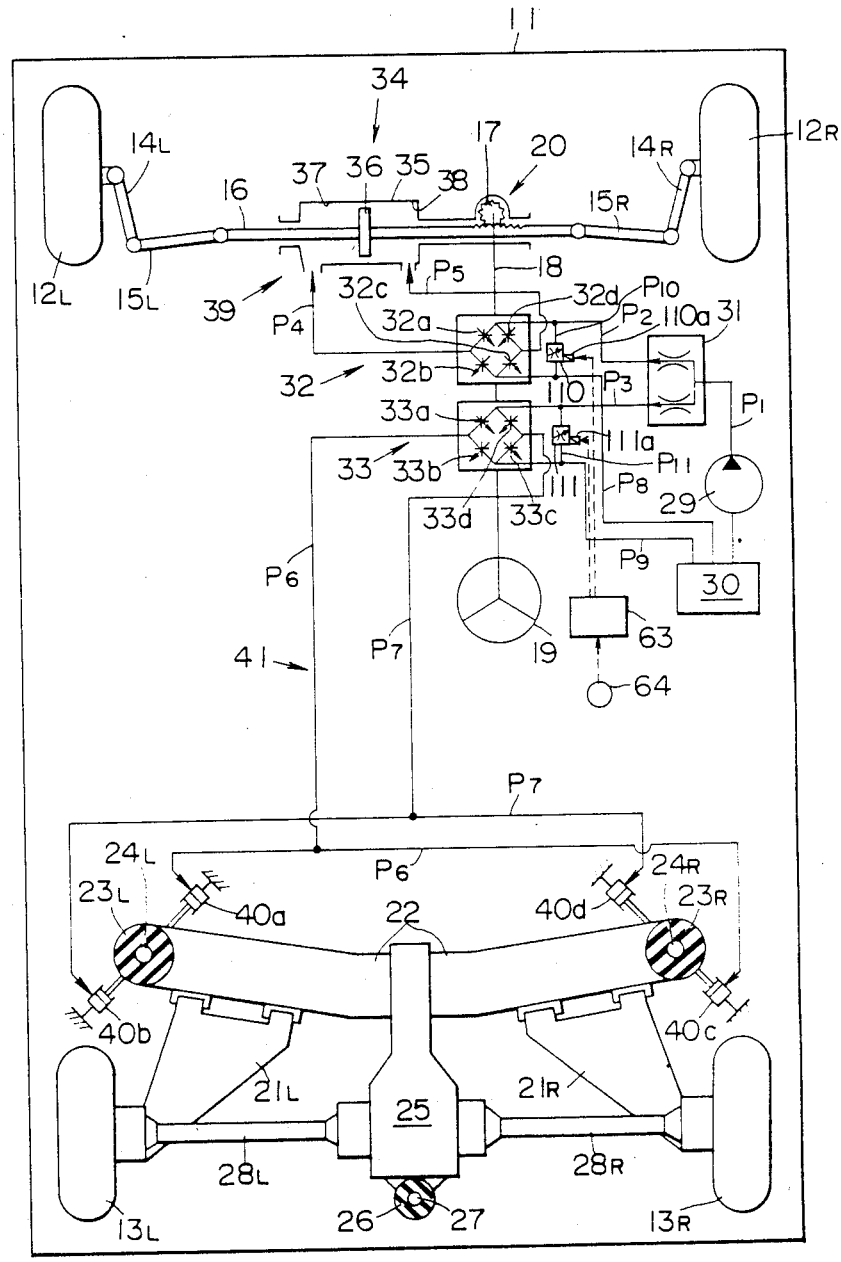
FIG. 10 is a schematic representation of a fifth embodiment of a steering system according to the present invention.

FIG. 10 illustrates a fifth embodiment of the steering system according to the present invention. In this embodiment, a first bypass line or passage $P_{10}$ is provided to fluidly connect the lines $P_2$ and $P_8$, and a second bypass line or passage $P_{11}$ is provided to fluidly connect the lines $P_3$ and $P_9$. Disposed in the first and second bypass lines $P_{10}$ and $P_{11}$ are first and second pressure-compensated flow-amount control valves 110, 111, respectively, which are known per se. The pressure-compensated flow-amount control valves 110, 111 have solenoids 110a, 111a, respectively, which are electrically connected to the control unit 63 which is in turn electrically connected to the vehicle speed sensor 64 so that the flow-amount control valves 110, 111 are controlled in response to the vehicle speeds V.

Also with this steering control system of FIG. 10, the fluid pressures to be supplied to the respective first and second control valves 32, 33 are controlled in accordance with the vehicle speeds V so as to obtain the flow amount characteristics, for example, as shown in FIGS. 5A and 5B, or FIGS. 6A and 6B. Accordingly, the control of the power steering system 39 and the compliance steer control system 41 is made in response to vehicle speeds like in the second and third embodiments of FIG. 3 to 8, so that improved cornering performance of the vehicle and good steering feeling can be obtained.

Furthermore, in this steering system, the control of hydraulic fluid amount to be supplied to the power steering system 39 and the compliance steering control system 41 can be independently made without being affected or restricted by the discharge amount of the pump 29. More specifically, the amount of fluids to be supplied to the respective control valves 32, 33 is controlled by feeding back into the reservoir, under the action of the flow-amount control valves 110, 111, the fluids which have been distributed in a predetermined dividing ratio by the flow dividing valve 31 and can be decreased regardless of the fluid amount supplied from the flow dividing valve 31 thereby to widen a controllable range of the fluid amount to be supplied to the control valves 32, 33.

What is claimed is:

1. A steering system of a vehicle having a steering wheel, and front and rear wheels, comprising:
   a steering gear through which steering effort applied to the steering wheel is transmitted to the front wheels so as to turn the front wheels;
   means for providing hydraulic fluid under pressure:
   first and second control valves for controlling flow of the hydraulic fluid from said hydraulic fluid providing means in response to rotation of the steering wheel;
   a flow dividing valve fluidly connected to said hydraulic fluid providing means to distribute in a predetermined flow dividing ratio the hydraulic fluid into said first and second control valves;
   a power cylinder associated with said steering gear and fluidly connected to said first control valve so as to develop steering assist power for turning the front wheels: and an actuator drivingly connected to the rear wheels and fluidly connected to said second control valve so as to turn the rear wheels in response to the hydraulic fluid supplied to said actuator.

2. A steering system as claimed in claim 1, further comprising means changing the flow dividing ratio of said flow control valve.

3. A steering system as claimed in claim 1, wherein said flow dividing valve is arranged to change the flow dividing ratio in response to vehicle speeds.

4. A steering system as claimed in claim 2, wherein said flow dividing ratio changing means so changes the flow dividing ratio as to decrease amount of the hydraulic fluid to be supplied to said first control valve in a high vehicle speed range in comparison with in a low vehicle speed range, while to increase amount of the hydraulic fluid to be supplied to the second control valve in said high vehicle speed range in comparison with in said low vehicle speed range.

5. A steering system as claimed in claim 2, wherein said flow dividing ratio changing means is so arranged that the flow driving ratio is changed by a manually operated switch.

6. A steering system as claimed in claim 1, wherein said flow dividing valve including:
a housing having an inlet port communicated with said hydraulic fluid providing means, and first and second outlet ports respectively communicated with said first and second control valves;
first and second spools slidably movably disposed within said housing and respectively defining first and second control chambers which are communicated with said inlet port through first and second fixed orifices, respectively, said first and second spools being respectively movable in response to pressures within said first and second control chambers;
first and second control orifices whose flow passage area changes in response to displacement of said spools, said first control orifice establishing communication between said first control chamber and said first outlet port, said second control orifice establishing communication between said second control chamber and said second outlet port; and
centering springs for biasing said first and second spools to their neutral positions.

7. A steering system as claimed in claim 2, wherein said flow dividing valve including:
a housing having an inlet port communicable with said hydraulic fluid providing means, and first and second outlet ports respectively communicated with said first and second control valves;
first and second spools slidably movably disposed within said housing and respectively defining first and second fluid chambers which are communicable with said inlet port through first and second communication holes, respectively, said first and second spools being respectively movable in response to pressures within said first and second fluid chambers;
first and second variable orifices whose flow passage area changes in response to displacement of said spools, said first variable orifice establishing communication between said first fluid chamber and said first outlet port, said second variable orifice establishing communication between said second fluid chamber and said second outlet port;
centering springs for biasing said first and second spools to their neutral positions; and
means for controlling amount of the hydraulic fluid to be supplied through said second communication hole into said second fluid chamber.

8. A steering system as claimed in claim 7, wherein said hydraulic fluid amount controlling means of said flow dividing valve includes a cylindrical member within which said first and second spools are slidably movably disposed, means defining first and second communication chambers between said cylindrical member and said respective first and second spools, means defining in said cylindrical member first and second control orifices through which said inlet port is communicated with said first and second communication chambers, respectively, and a solenoid-operated valve adapted to change flow passage area of said second control orifice.

9. A steering system as claimed in claim 8, wherein said flow dividing valve includes first and second sleeves secured to said housing, said first and second spools being slidably movably disposed within said first and second sleeve members, respectively, said first sleeve having a first hole communicated with said first outlet port, said first spool having a second hole communicated with said first fluid chamber, said first and second holes being communicable with each other to constitute said first variable orifice, said second sleeve having a third hole communicated with said second outlet port, second spool having a fourth hole communicated with said second fluid chamber, said third and fourth holes being communicable with each other to constitute said second variable orifice.

10. A steering system as claimed in claim 8, further comprising means for actuating said solenoid-operated valve in response to vehicle speeds.

11. A steering system as claimed in claim 2, wherein said flow dividing valve including:
a housing having an inlet port communicated with said hydraulic fluid providing means, and first and second outlet ports, respectively communicated with said first and second control valves;
first and second spools slidably movably disposed within said housing and respectively defining first and second control chambers which are communicated with said inlet port through first and second fixed orifices, respectively, said first and second spools being respectively movable in response to pressures within said first and second control chambers;
first and second control orifices whose flow passage area changes in response to displacement of said spools, said first control orifice estalishing communication between said first control chamber and said first outlet port, said second control orifice establishing communication between said second control chamber and said second outlet port;
centering springs for biasing said first and second spools to their neutral positions; and
a variable orifice whose flow passage area is changeable, disposed in a hydraulic pressure line fluidly connecting said hydraulic fluid providing means with said inlet port, a portion of said hydraulic pressure line upstream of said variable orifice being communicated with said first control chamber, a portion of said hydraulic pressure line downstream of said variable orifice being communicated with said second control chamber.

12. A steering system as claimed in claim 11, wherein said flow dividing valve includes first and second sleeves secured to said housing, said first and second spools being slidably movably disposed within said first and second sleeves, respectively, said first sleeve having a first hole communicated with said first outlet port, said first spool having a second hole communicated with said first control chamber, said first and second holes being communicable with each other to constitute said first control orifice, said second sleeve having a third hole communicated with said second outlet port, said second spool having a fourth hole communicated with said second control chamber, said third and fourth holes being communicable with each other to constitute said second control orifice.

13. A steering system as claimed in claim 12, wherein said flow dividing valve includes first and second pistons which are movable relative to said first and second spools, respectively, said first piston dividing said first control chamber into a first main control chamber communicated with said first control orifice and a first auxiliary control chamber communicated with said portion of said hydraulic pressure line upstream of said variable orifice, said second piston dividing said second control chamber into a second main control chamber communicated with said second control orifice and a second auxiliary control chamber communicated with said portion of said hydraulic pressure line downstream of said variable orifice.

14. A steering system as claimed in claim 11, further comprising means for changing the flow passage area of said variable orifice in response to vehicle speeds.

15. A steering system as claimed in claim 1, wherein said flow dividing valve has an inlet port communicated through a first line with said hydraulic fluid providing means, a first outlet port communicated through a second line with an inlet port of said first control valve, and a second outlet port communicated through a third line with an inlet port of said second control valve, in which said first control valve has a first return port communicated through a fourth line with a reservoir, and said second control valve has a second return port communicated through a fifth line with said reservoir.

16. A steering system as claimed in claim 15, further comprising a first pressure-compensated flow-amount control valve fluidly interposed between said second and fourth lines, and a second pressure-compensated flow-amount control valve fluidly interposed between said third and fifth lines.

17. A steering system as claimed in claim 16, further comprising means for controlling operation of said first and second pressure-compensated flow-amount control valves in response to vehicle speeds.

* * * * *